United States Patent
Mauldin et al.

(10) Patent No.: US 6,660,242 B2
(45) Date of Patent: Dec. 9, 2003

(54) ALKALINE EARTH METAL FERRITE AND FERRIC OXIDE ADMIXTURE

(76) Inventors: Lloyd Ballard Mauldin, 779 Peeples Valley Rd. NW., Cartersville, GA (US) 30120; Jerry Allen Cook, 68 Woodcrest Dr. SW., Cartersville, GA (US) 30120

( * ) Notice: Subject to any disclaimer, the term of this patent is extended or adjusted under 35 U.S.C. 154(b) by 33 days.

(21) Appl. No.: 10/035,381

(22) Filed: Dec. 28, 2001

(65) Prior Publication Data

US 2003/0122102 A1 Jul. 3, 2003

(51) Int. Cl.[7] ............................................. C01D 1/02
(52) U.S. Cl. ................... 423/594.2; 423/633; 423/634
(58) Field of Search ........................... 423/594, 633, 423/634, 594.2; 252/62.63, 62.56

(56) References Cited

U.S. PATENT DOCUMENTS 3,378,335 A * 4/1968 Ellis et al. .................... 423/99
4,886,714 A * 12/1989 Torii et al. ............. 428/694 BH
5,433,878 A * 7/1995 Arai et al. ................ 252/62.63

FOREIGN PATENT DOCUMENTS

EP         1090884      *   4/2001

* cited by examiner

Primary Examiner—C. Melissa Koslow

(57) ABSTRACT

A method is disclosed for the manufacture of particles composed of an intimate admixture of barium or strontium ferrite and ferric oxide from a chloride solution containing barium or strontium ions and ferrous ions by a pyrohydrolysis reaction. The presence of carbon dioxide in the heated atmosphere in which pyrohydrolysis of an admixture of alkaline earth metal chloride and iron chloride is carried out has been discovered to substantially decrease the temperature required for reaction to occur.

20 Claims, No Drawings

ALKALINE EARTH METAL FERRITE AND FERRIC OXIDE ADMIXTURE

BACKGROUND OF THE INVENTION

1. Field of the Invention

This invention relates to the production of powders composed of barium or strontium ferrite intimately admixed with ferric iron oxide to be employed as raw materials in the production of polymer-bound magnetic materials and ceramic permanent magnets.

2. Description of the Related Art

Barium and strontium hexaferrite powders, represented by the formula $MO \cdot (Fe_2O_3)_x$ where M is barium or strontium and x is about 5 to 6, are crystalline compounds produced for incorporation into a polymeric matrix to form flexible magnetic materials or into ceramic permanent magnets.

The most prevalent current production method for barium or strontium hexaferrite powder is the preparation of an admixture of discrete particles of barium carbonate or strontium carbonate and discrete particles of ferric oxide, then reaction of the admixture at high temperature for a period of several hours. The barium or strontium carbonate and iron oxide may be admixed as dry powders, or they may be formed into an aqueous suspension and mixed prior to introduction into a heating device. In some cases, an aqueous suspension of barium or strontium carbonate and iron oxide is subjected to ball milling or some other grinding process to reduce the size of the individual particles prior to introduction into a heating device. The reaction between the alkaline earth metal carbonate particles and iron oxide particles proceeds at temperatures above about 900° C. and is believed to proceed stepwise with the formation of intermediate ferrite products prior to the formation of the final crystalline barium or strontium hexaferrite displaying the desired magnetic properties. This production method suffers from problems associated with (1) difficulty in achieving a uniform admixture of the discrete particles of the reactants, (2) long reaction times resulting from the slow diffusion of the reactants from the discreet solid particles, and (3) difficulty in assuring that the alkaline earth metal carbonate particles and the iron oxide particles are of a consistent, small size so as to yield a consistent number of surface contact sites which can become ferrite crystal nucleation sites under high-temperature reaction conditions.

Several techniques have been invented to try to overcome the shortcomings of the admixed discrete powder method for producing barium and strontium hexaferrites. U.S. Pat. No. 4,116,752 teaches preparation of strontium hexaferrite or barium hexaferrite particles by reacting iron oxide, iron hydroxide, or iron oxyhydroxide with strontium or barium carbonate, carboxylate, oxide, or hydroxide in the presence of strontium chloride or barium chloride flux. After reacting this admixture at temperatures up to 1300° C., the water-soluble barium chloride or strontium chloride flux is extracted from the ferrite product by washing with water. This procedure is taught to produce well-defined single crystals that are not agglomerated.

U.S. Pat. No. 4,062,922 teaches that strontium nitrate solution and ferric nitrate solution can be admixed to prepare a solution containing 10.8 molecular weights of iron for each molecular weight of strontium, and this admixture can be dried in a spray dryer. The dried material from the spray dryer is then heated in air at 600° C. for about 16 hours to obtain intimately mixed grains of iron oxide and strontium oxide less than 0.02 microns in diameter; further heating at 1000° C. for 4 hours yields ferrite powder of composition $SrFe_{10.8}O_{17.2}$, or $SrO \cdot 5.4Fe_2O_3$.

U.S. Pat. No. 4,062,922 teaches preparation of alkaline earth metal ferrite magnets beginning with nitrate solutions. U.S. Pat. No. 5,306,592, teaches coprecipitation of barium or strontium hydroxide and iron hydroxide to form a raw material for ferrite production. These patents teach that particles composed of co-precipitated alkaline earth metal salt and iron salt can be subjected to high temperature reaction conditions to yield alkaline earth ferrite powders with superior magnetic properties if the salts can be easily decomposed to the oxides by heating. U.S. Pat. No. 4,025,449 teaches that mixed hydroxide precipitates containing alkaline earth metal ions and ferric iron ions in the proportions necessary to produce alkaline earth metal hexaferrite can be recovered from solutions of soluble iron salts and soluble alkaline earth metal salts; insoluble hydroxide precipitates are formed when a solution of an alkaline earth metal salt and a solution of a ferric iron salt are admixed and then added to an alkali metal hydroxide solution. This precipitate can then be reacted at temperatures up to 1500° C., for times up to several hours, to yield consistent fine crystals of alkaline earth metal hexaferrite. Thus, it is well established that intimate admixtures of barium or strontium compounds and ferric iron compounds can be advantageously employed to produce barium or strontium hexaferrite crystals with superior magnetic properties; however, the prior art methods for achieving intimate admixture have suffered from various serious drawbacks including relatively expensive raw materials, the handling of aqueous suspensions of gelatinous precipitates, disposal or treatment of dilute salt solutions, and possibly the control of air emissions of pollutants such as oxides of nitrogen.

Almost all of the iron oxide presently being used as a raw material in the production of alkaline earth metal hexaferrite powders is a by-product of the recovery of hydrochloric acid from spent steel pickle liquor. The surface of steel sheet is cleaned by contacting it with a hydrochloric acid solution which dissolves the scale and corrosion present on the steel surface; this yields a ferrous chloride solution called spent pickle liquor. The most widely practiced means of dealing with this spent pickle liquor has become pyrohydrolysis in a spray roaster or similar equipment at temperatures up to about 1000° C. to yield hydrochloric acid (hydrogen chloride gas generated during the reaction absorbed in water) for reuse in the steel cleaning operation, and a ferric iron oxide powder by-product. This pyrohydrolysis reaction takes place in the presence of water vapor and oxygen as described by the following equation:

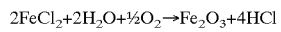

$$2FeCl_2 + 2H_2O + \tfrac{1}{2}O_2 \rightarrow Fe_2O_3 + 4HCl$$

Methods have been developed to produce ferric iron oxide derived from the spent pickle liquor that is acceptable for use in the ferrite magnet industry, as a pigment, and in other applications.

Since the iron oxide utilized as a raw material in the production of alkaline earth metal ferrite magnets is recovered from iron chloride solution by a pyrohydrolysis reaction, direct production of particles composed of an intimate admixture of strontium or barium ferrite and ferric iron oxide by pyrohydrolysis eliminates duplication of processing steps and overcomes many of the shortcomings of the admixed discrete powders method of producing alkaline earth metal ferrite magnetic powders.

U.S. patent application Ser. No. 09/643,894, assigned to Chemical Products Corporation, now abandoned, teaches that particles composed of intimately admixed alkaline earth metal ferrite and ferric oxide can be produced from a solution containing alkaline earth metal chloride and iron chloride. This chloride solution reacts to form alkaline earth metal ferrite and ferric oxide at temperatures above about 800° C., and preferably above about 1000° C., in an atmosphere containing oxygen and water vapor. Spray roasting a chloride solution containing alkaline earth metal ions and iron ions in a ratio of about 1 alkaline earth metal atom to about 11.5 iron atoms yields an intimate admixture of alkaline earth metal ferrite and iron oxide that can be advantageously employed in the production of alkaline earth metal hexaferrite magnetic powders.

European Patent Application number 1 090 884, to Sumitomo Special Metals Co., Ltd., published Apr. 11, 2001, teaches that the temperature in the reaction zone of a spray roaster can be increased sufficiently to form a magnetic powder product composed of crystalline strontium or barium hexaferrite from a chloride solution by introducing additional hydrocarbon fuel into the spray roaster admixed with the chloride solution. A solution of barium or strontium chloride and iron chloride can be admixed with a hydrocarbon fuel and sprayed into a spray roaster to raise the local temperature where the chlorides are undergoing pyrohydrolysis. The fuel introduced into the spray roaster with the chloride solution is in addition to the heat supplied to the spray roaster by heating the gases entering it to achieve temperatures in excess of about 1000° C.

The production of an intimate admixture of alkaline earth metal ferrite and iron oxide from a solution of chlorides taught in U.S. patent application Ser. No. 09/643,894, now abandoned, and the production of alkaline earth metal hexaferrite from a solution of chlorides taught in European Patent Application number 1 090 884, both suffer from the drawback that high temperatures are required to achieve reaction to yield an alkaline earth metal ferrite.

BRIEF SUMMARY OF THE INVENTION

It has been discovered that a chloride solution containing alkaline earth metal ions and iron ions will react with oxygen and water vapor to yield hydrogen chloride, ferrric oxide, and alkaline earth metal ferrite at a significantly lower temperature if carbon dioxide is also present in the heated atmosphere. Pyrohydrolysis is the term used to describe the reaction of oxygen and water vapor with ferrous chloride to yield ferric oxide and hydrogen chloride, and the reaction of water vapor with strontium chloride. A chloride solution containing alkaline earth metal ions and iron ions can be sprayed into a heated atmosphere containing oxygen, water vapor, and carbon dioxide, to undergo pyrohydrolysis to form an intimate admixture of alkaline earth metal ferrite and iron oxide at a substantially lower temperature than the temperature required to carry out this reaction in an atmosphere containing the same concentration of oxygen and water vapor, but containing nitrogen rather than carbon dioxide. The catalytic effect of carbon dioxide upon the reaction is unexpected and presently unexplained.

It is an object of the present invention to reduce the cost of producing alkaline earth metal ferrites directly from the ferrous chloride solution resulting from the cleaning of steel with hydrochloric acid by utilizing a gaseous catalyst to reduce the temperature necessary to convert an intimate admixture of alkaline earth metal chloride and iron chloride to an intimate admixture of alkaline earth metal ferrite and iron oxide. It is a further object of the present invention to produce an intimate admixture of alkaline earth metal ferrite and iron oxide utilizing the type of spray roaster pyrohydrolysis process equipment currently being used to produce hydrogen chloride and ferric oxide from spent pickle liquor ferrous chloride solution. It is yet a further object of the present invention to produce crystalline alkaline earth metal hexaferrites having a substantially uniform small particle size by allowing the particles of the intimate admixture of alkaline earth metal ferrite and ferric oxide to undergo further reaction a temperature above about 800° C. to allow nucleation and growth of alkaline earth metal hexaferrite crystals.

DETAILED DESCRIPTION OF THE INVENTION

The present invention concerns a process for preparing particles composed of intimately admixed barium or strontium ferrite and iron oxide from a mixed solution of strontium or barium chloride and iron chloride. It has been discovered that carbon dioxide promotes the reaction of an admixture of alkaline earth metal chloride and iron chloride with oxygen and water vapor at elevated temperatures. It is speculated that the carbon dioxide specifically catalyzes the reaction of the alkaline earth metal chloride with water vapor and ferric oxide to form alkaline earth metal monoferrite.

The process of the present invention involves coprecipitation of alkaline earth metal chloride and iron chloride as an intimate admixture through evaporation of water from a chloride solution containing alkaline earth metal ions and iron ions. The coprecipitated chlorides are then reacted at temperatures from about 300° C. up to about 1000° C., and preferrably from about 400° C. up to about 800° C., in an atmosphere containing water vapor, oxygen, and carbon dioxide. The carbon dioxide should be present at a level of at least about 5% by weight in the heated atmosphere in contact with the coprecitated chlorides, and preferrably carbon dioxide should make up at least about 20% by weight of the heated atmosphere. Most preferrably, carbon dioxide should be present in the heated atmosphere at a level of at least about 40% by weight. It is contemplated that this invention would be employed to produce particles of intimately admixed barium or strontium ferrite and ferric oxide for use as a raw material in the production of barium or strontium hexaferrite powder. Use of particles of intimately admixed barium or strontium ferrite and ferric oxide in place of discrete ferric oxide particles and discrete barium or strontium carbonate particles in the conventional admixed discrete powders production method for barium or strontium hexaferrite powders promotes more rapid nucleation and growth of alkaline earth metal hexaferrite crystals.

We hypothesize that when a chloride solution containing strontium or barium ions in addition to iron ions is subjected to pyrohydrolysis, the ferrous chloride reacts first in the presence of water vapor and oxygen as described by the following equation:

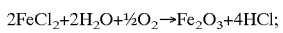

subsequently, at a higher temperature, the strontium chloride or barium chloride is believed to react with water vapor and the previously formed ferric oxide to yield strontium monoferrite, or barium monoferrite, and hydrogen chloride as shown in the following chemical equation for strontium:

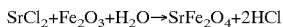

$SrFe_2O_4$ is also written, $SrO.Fe_2O_3$

In both reactions a significant loss of weight of the solids undergoing reaction occurs as the heavier chloride becomes part of the gas phase and is replaced by oxygen in the solid phase.

If the proportion of strontium to iron in the chloride solution is within the range required for the eventual formation of strontium hexaferrite crystals (1:11.5), the theoretical weight loss for the conversion of only the ferrous chloride present in the 1:11.5 chloride solution to ferric oxide is 33.4%; whereas, the theoretical weight loss for conversion of both the strontium chloride and the ferrous chloride to strontium ferrite and ferric oxide is 36.8%. Thus, the reaction of the strontium chloride increases the weight loss to about 110% of the weight loss expected from the reaction of the ferrous chloride in the solution alone. This weight loss from the solid phase can be monitored to evaluate the degree of completion of the pyrohydrolysis reaction; increasing weight loss upon heating to about 800° C. has been observed as the amount of carbon dioxide in the atmosphere in contact with the solid chlorides has increased.

The process of the present invention can be practiced by spraying a chloride solution containing alkaline earth metal ions and iron ions into a heated atmosphere containing at least 5 weight percent carbon dioxide, and preferable at least 20 weight percent carbon dioxide, in addition to the oxygen and water vapor required to carry out the pyrohydrolysis reaction. A chloride solution containing alkaline earth metal ions and iron ions can be heated to a temperature below 800° C. in an atmosphere containing oxygen and water vapor to effect reaction to the ferrous chloride with oxygen and water vapor to form ferric oxide, then the powder so formed can be exposed to a heated atmosphere containing less oxygen, as well as water vapor, and at least 5 weight percent carbon dioxide at a temperature up to about 800° C., but preferably not above about 1000° C. to effect the reaction of the alkaline earth metal chloride, water vapor, and ferric oxide to form an alkaline earth metal ferrite.

While the invention has been described with particular reference to a preferred embodiment, it will be understood by those skilled in the art that various changes may be made and equivalents may be substituted for elements of the preferred embodiment without departing from the invention. In addition, many modifications may be made to adapt a particular situation and material to a teaching of the invention without departing from the essential teachings of the present invention. The term "alkaline earth metal chloride" when used herein encompasses mixtures of two or more alkaline earth metal chlorides.

Additional objectives and advantages of this invention can be deduced from the following examples, or may be learned by practice of the invention.

EXAMPLE 1

Reagent grade hydrated ferrous chloride, $FeCl_2 \cdot 4H_2O$, and reagent grade hydrated strontium chloride, $SrCl_2 \cdot 6H_2O$ were weighed into a beaker in the proper proportion to yield a ratio of one strontium atom to 11.5 iron atoms. Distilled water was added to the beaker to dissolve the chlorides, and the beaker was stirred and heated to drive off water until the chlorides formed a solid mass at the bottom of the beaker. This solid mass was crushed and ground in a mortar and pestle to form a fine powder of intimately admixed strontium chloride and ferrous chloride.

The intimately admixed strontium chloride and ferrous chloride powder was subjected to thermal gravimetric analysis in three different gas atmospheres; in each case a sample weighing about 2 grams was heated at the rate of 10° C. per minute to a temperature above 800° C. The three gas atmospheres tested were Atm. 1—20% Water, 18% Oxygen, balance Nitrogen
Atm. 2—20% Carbon Dioxide, 20% Water, 18% Oxygen, balance Nitrogen
Atm. 3—40% Carbon Dioxide, 20% Water, 18% Oxygen, balance Nitrogen The carbon dioxide, oxygen, and nitrogen were weighed into a pressurized cylinder, then the gas in the cylinder was bubbled through heated water to achieve 20 weight percent water vapor in the mixture of gases introduced into the furnace containing the test material.

In all three tests, weight was lost almost from the onset of heating; this is assumed to be exclusively loss of water of hydration below a temperature of about 300° C. In each test, 34% of the sample weight was lost in heating to 300° C. Weight loss at temperatures above 300° C. is assumed to be the result of some further loss of water of hydration, as well as weight loss resulting from the following reactions

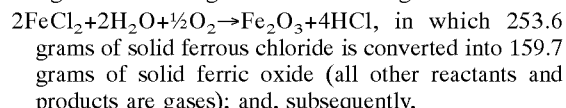
$2FeCl_2 + 2H_2O + \tfrac{1}{2}O_2 \rightarrow Fe_2O_3 + 4HCl$, in which 253.6 grams of solid ferrous chloride is converted into 159.7 grams of solid ferric oxide (all other reactants and products are gases); and, subsequently,

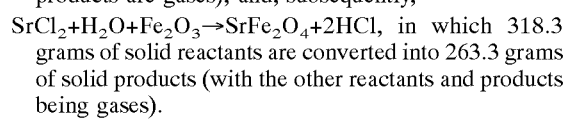
$SrCl_2 + H_2O + Fe_2O_3 \rightarrow SrFe_2O_4 + 2HCl$, in which 318.3 grams of solid reactants are converted into 263.3 grams of solid products (with the other reactants and products being gases).

It is assumed that the reaction of strontium chloride occurs after essentially all of the iron chloride has been converted to ferric oxide. The theoretical weight loss for the conversion of only the anhydrous ferrous chloride present in the tested admixture to ferric oxide is 33.4%; whereas, the theoretical weight loss for conversion of the entire anhydrous admixture of strontium chloride and ferrous chloride to strontium ferrite and ferric oxide is 36.8%.

Table 1 below shows the observed weight loss when the sample was heated in the three different atmospheres:

|  | Atm. 1 - 0% CO2 | Atm. 2 - 20% CO2 | Atm. 3 - 40% CO2 |
| --- | --- | --- | --- |
| Weight loss upon reaching 300° C. | 34% | 34% | 34% |
| Cumulative weight loss upon reaching 800° C. | 64.8% | 69.0% | 70.4% |

EXAMPLE 2

Strontium carbonate powder is reacted with hydrochloric acid solution to form a strontium chloride solution having a pH of about 4. The strontium chloride solution is mixed with an iron chloride solution in proportions such that the final chloride solution contains 50 g/L of strontium chloride and 440 g/L of ferrous chloride, that is, 11 molecular weights of iron for each 1 molecular weight of strontium. The solution is continuously sprayed into a spray-roasting reactor which consists of a cylindrical tower lined with refractory ceramic material and several burners arranged around the circumference of the lower portion of the cylinder. These burners burn hydrocarbon fuel with oxygen-enriched air to supply hot gases containing more than 30 weight percent carbon dioxide to the inside of the reactor, producing a rotary flow and subjecting the particles resulting from the drying of the spray droplets to temperatures in excess of 600° C. A powder consisting of intimately admixed strontium ferrite and iron oxide is continuously withdrawn from the lower part of the reactor by means of a rotary valve. The gases from the reactor are cooled and hydrochloric acid gas is scrubbed out of the cooled gases, thus the hydrochloric acid required to solublize the strontium carbonate is recovered and does not represent an expensive addition to the cost of the process.

The hot, intimately admixed strontium ferrite and iron oxide powder is transferred to a rotary kiln as it leaves the spray roaster to be heated to a temperature in excess of about 800° C. for a time sufficient to allow formation of crystalline strontium hexaferrite.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

We claim:

1. The method of preparing particles composed of an intimate admixture of alkaline earth metal ferrite and ferric oxide from a chloride solution containing alkaline earth metal ions and iron ions by spraying said chloride solution into a heated atmosphere containing oxygen, water, and at least about 5 weight percent carbon dioxide.

2. The method of claim 1, in which the heated atmosphere contains oxygen, water, and at least about 20 weight percent carbon dioxide.

3. The method of claim 1, in which the chloride solution containing alkaline earth metal ions and iron ions contains strontium ions.

4. The method of claim 1, in which the chloride solution containing alkaline earth metal ions and iron ions contains barium ions.

5. The method of claim 1, in which the chloride solution containing alkaline earth metal ions and iron ions contains both barium ions and strontium ions.

6. The method of claim 1, in which the chloride solution containing alkaline earth metal ions and iron ions contains ferrous iron ions.

7. The method of claim 1, in which the chloride solution containing alkaline earth metal ions and iron ions is sprayed into a spray roaster.

8. The method of claim 1, in which the heated atmosphere contains oxygen, water, and at least about 40 weight percent carbon dioxide.

9. The method of producing particles of intimately admixed alkaline earth metal ferrite and ferric oxide from a chloride solution containing alkaline earth metal ions and iron ions, which comprises:

(a.) Heating the chloride solution to evaporate water from the solution and form coprecipitated alkaline earth metal chloride and iron chloride;

(b.) Heating the coprecipitated alkaline earth metal chloride and iron chloride in an atmosphere containing water vapor, oxygen, and at least about 5 weight percent carbon dioxide to a temperature from about 400° C. to about 1000° C. to form hydrogen chloride gas and particles of intimately admixed alkaline earth metal ferrite and ferric oxide.

10. The method of claim 9, in which the chloride solution containing alkaline earth metal ions and iron ions contains ferrous iron ions.

11. The method of claim 9, in which the chloride solution containing alkaline earth metal ions and iron ions contains strontium ions.

12. The method of claim 9, in which step (a.) and step (b.) are carried out in a single piece of equipment.

13. Particles of intimately admixed alkaline earth metal ferrite and ferric oxide produced by the method of claim 9.

14. The method of claim 9, in which the atmosphere in step (b.) contains at least about 20 weight percent carbon dioxide.

15. The method of producing particles of intimately admixed alkaline earth metal ferrite and ferric oxide from a chloride solution containing alkaline earth metal ions and iron ions, which comprises:

(a.) Heating the chloride solution to evaporate water from the solution and form particles composed of coprecipitated alkaline earth metal chloride and iron chloride;

(b.) Heating the particles composed of coprecipitated alkaline earth metal chloride and iron chloride in an atmosphere containing water vapor and oxygen to a temperature from about 400° C. to about 800° C. to form hydrogen chloride gas and particles composed of ferric oxide intimately admixed with alkaline earth metal chloride;

(c.) Heating the particles composed of ferric oxide intimately admixed with alkaline earth metal chloride in an atmosphere containing water vapor and at least about 5 weight percent carbon dioxide to a temperature from about 800° C. to about 1000° C. for a sufficient time to form hydrogen chloride gas and particles of alkaline earth metal ferrite.

16. The method of claim 15, in which the chloride solution containing alkaline earth metal ions and iron ions contains ferrous iron ions.

17. The method of claim 15, in which the chloride solution containing alkaline earth metal ions and iron ions contains strontium ions.

18. The method of claim 15, in which steps (a.) and (b.) are carried out in a single piece of equipment.

19. The method of claim 18, in which the single piece of equipment is a spray roaster.

20. Particles of alkaline earth metal ferrite produced by the method of claim 15.

* * * * *